United States Patent [19]

Vohland et al.

[11] Patent Number: 4,944,671
[45] Date of Patent: Jul. 31, 1990

[54] METHOD AND APPARATUS FOR STORING AND DISPENSING ENVIRONMENTALLY SENSITIVE MATERIALS

[75] Inventors: Marion G. Vohland; Edwin M. Odom; Herbert H. Harris, Jr., all of Albuquerque, N. Mex.

[73] Assignee: General Electric Company, Cincinnati, Ohio

[21] Appl. No.: 223,506

[22] Filed: Jul. 25, 1988

[51] Int. Cl.5 .............................. F27B 9/25
[52] U.S. Cl. ............................ 432/8; 432/59
[58] Field of Search ...................... 432/8, 59

[56] References Cited

U.S. PATENT DOCUMENTS

| | | | |
|---|---|---|---|
| 2,218,354 | 10/1940 | Keller | 432/8 |
| 2,441,500 | 5/1948 | Miess | 432/8 |
| 3,523,356 | 8/1970 | Graf | 29/453 |
| 3,982,987 | 9/1976 | Kuehn | 156/361 |
| 4,165,964 | 8/1979 | Yonezawa et al. | 432/59 |
| 4,306,856 | 12/1981 | Arippol | 432/8 |
| 4,485,059 | 11/1984 | Krutchen et al. | 432/59 |
| 4,588,378 | 5/1986 | Yamamoto et al. | 432/59 |
| 4,793,802 | 12/1988 | Chilva | 432/59 |

FOREIGN PATENT DOCUMENTS 219431 3/1985 Fed. Rep. of Germany .
2046163 11/1980 United Kingdom .

Primary Examiner—Henry C. Yuen
Attorney, Agent, or Firm—Jerome C. Squillaro

[57] ABSTRACT

Apparatus and method for storing and subsequently dispensing environmentally sensitive material into a manufacturing process is disclosed. The material is stored in an environmentally controlled chamber and conditioned prior to being dispensed into the manufacturing process.

11 Claims, 4 Drawing Sheets

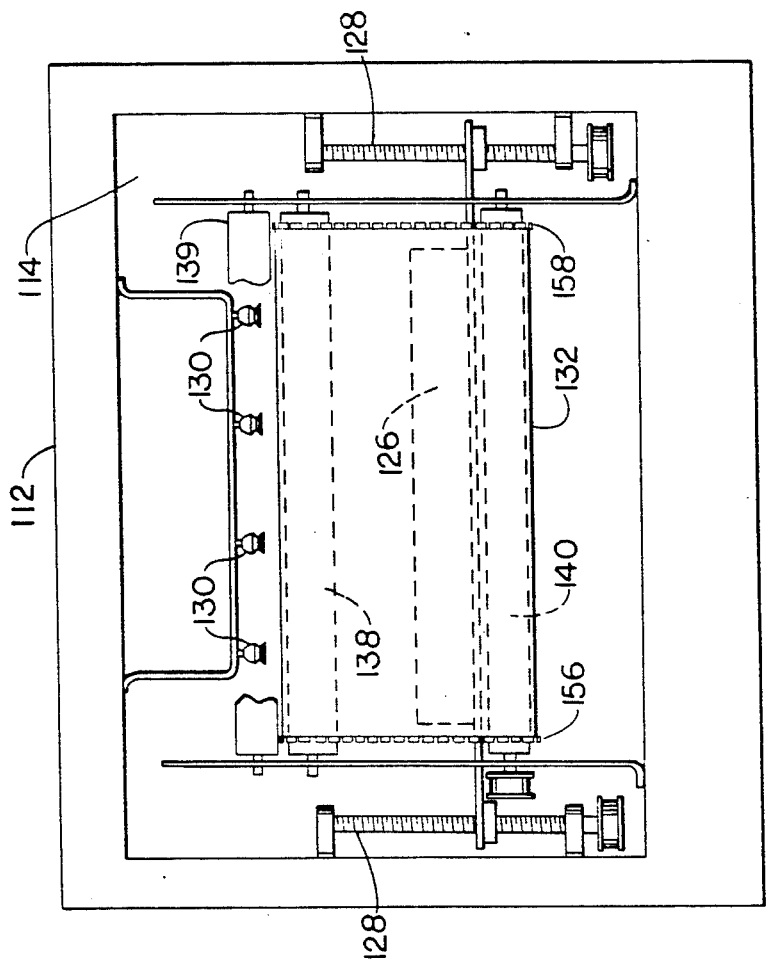
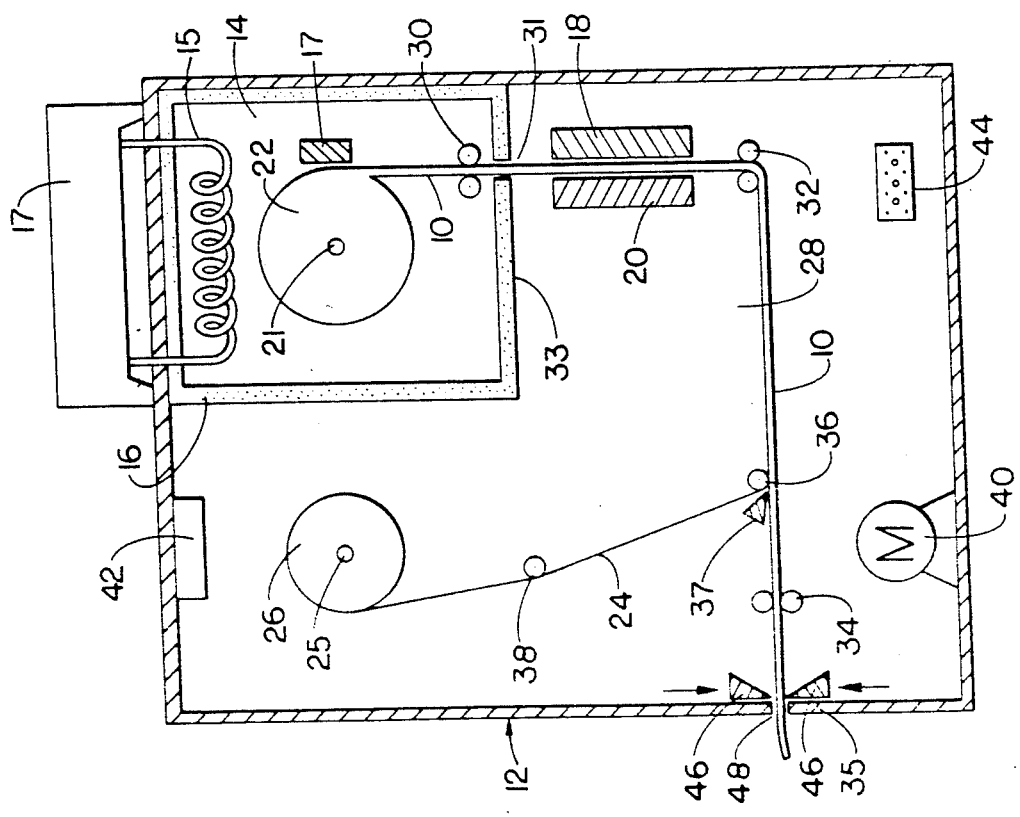

METHOD AND APPARATUS FOR STORING AND DISPENSING ENVIRONMENTALLY SENSITIVE MATERIALS

The United States Government has rights in this invention pursuant to Contract Number F33657-83-C-0281.

The present invention relates in general to a material storage and dispensing apparatus and method and more specifically to an apparatus and method which allows such material to be stored and subsequently dispensed from a controlled environment directly into a manufacturing process.

BACKGROUND OF THE INVENTION

Thermosetting materials, such as for example composite materials for use in the manufacture of aircraft engine components, are subject to deterioration through chemical reaction during storage prior to use. Such chemical reaction may reduce the ability to work the material in the manner desired and may affect the uniformity of its quality. This chemical reaction may be inhibited by storing the thermosetting materials under controlled conditions, e.g. storage in a low temperature, low humidity environment. To do so, a refrigerated space must be set aside, preferably close to or within the manufacturing area.

Once refrigerated, the thermosetting material becomes difficult to handle and must be removed from the controlled environment and allowed to warm to near ambient temperature before it can be worked so as to be capable of entering the manufacturing process. This warming may take several hours during which time further chemical deterioration of the material can occur and for which additional space in the manufacturing area must be set aside. The movement of relatively large quantities of thermosetting material between the storage, warm-up and manufacturing areas requires effort and expense. Finally, the removal of the material from the controlled environment should be carefully coordinated with the manufacturing process in order to avoid delays and to reduce costs by withdrawing only such quantities of material as can be immediately used in the manufacturing process.

OBJECTS OF THE INVENTION

It is a primary object of the present invention to provide apparatus which allows environmentally sensitive material to be stored in a controlled environment and subsequently dispensed directly into a manufacturing process.

It is a further object of the present invention to provide apparatus for storing and dispensing environmentally sensitive material which protects the material from deterioration, such as through chemical reaction.

It is another object of the present invention to provide dispensing apparatus for environmentally sensitive material which will enable only the required amount of material to be metered out to the manufacturing process, thereby reducing material scrap.

It is an additional object of the present invention to provide a method for storing thermosetting material in a controlled environment and dispensing the material from the controlled environment into a manufacturing process.

Still a further object of the present invention is to provide a portable material dispensing mechanism which is capable of dispensing composite material at or near the manufacturing point.

These and other objects of the invention, together with the features and advantages thereof, will become apparent from the following detailed specification when read with the accompanying drawings in which applicable reference materials have been carried forward.

BRIEF DESCRIPTION OF THE DRAWINGS

FIG. 2 is a cross-sectional view of the apparatus of FIG. 1 taken along line 2—2;

FIG. 5 is a cross-sectional view of the apparatus of FIGS. 3 and 4 taken along line 5—5.

SUMMARY OF THE INVENTION

In accordance with one form of the present invention, an apparatus and method are provided for controlling the environmental conditions of an environmentally sensitive material prior to its use in a manufacturing process. A self-contained unit houses a storage chamber in which controlled conditions are maintained. The unit further includes a conditioning chamber in which the environment can be controlled, a mechanism for advancing the material, and one or more means for dispensing the material from the storage chamber, through the conditioning chamber, into the manufacturing process.

DETAILED DESCRIPTION OF THE INVENTION

Figure 1:
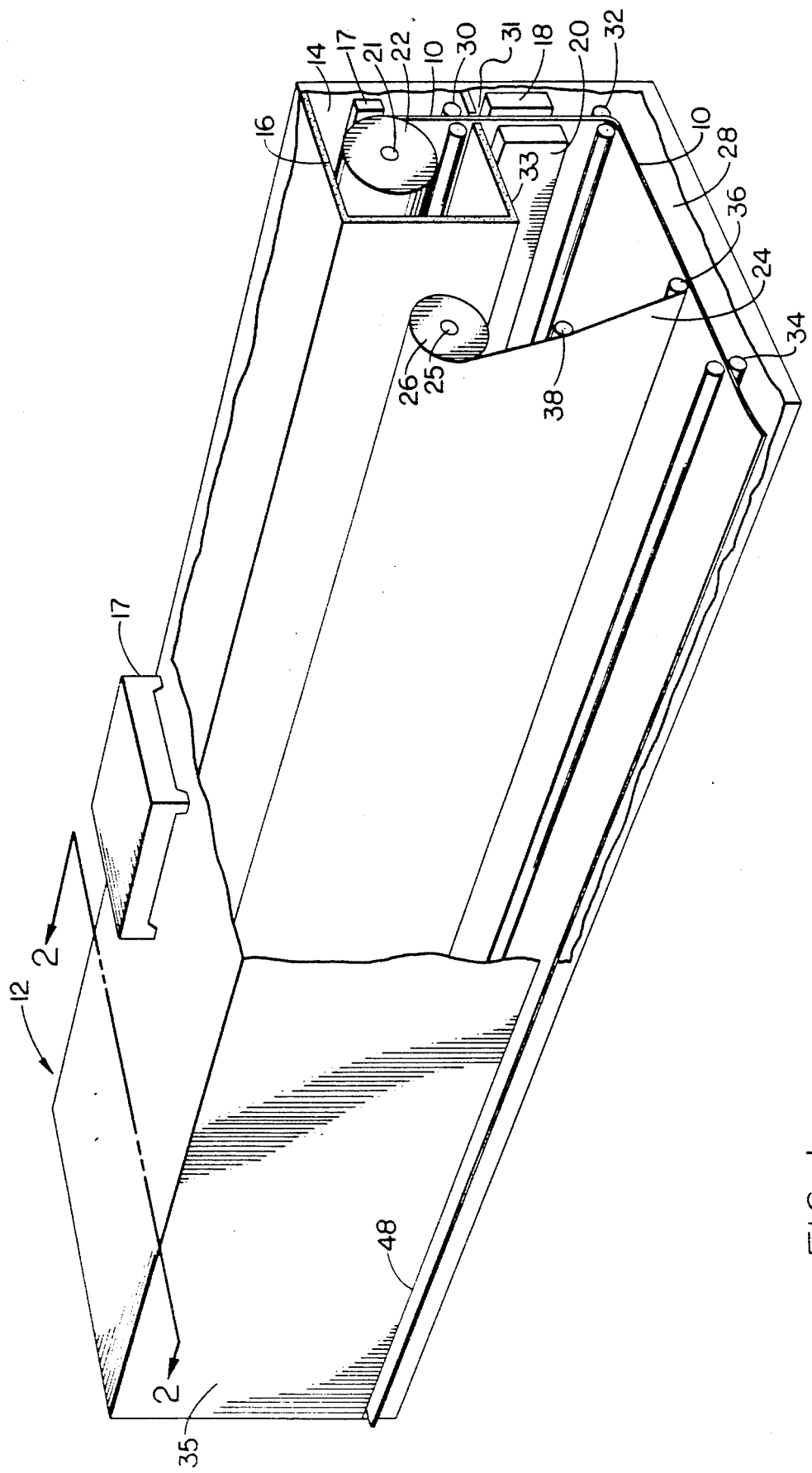
FIG. 1 is a perspective view of a preferred embodiment of the invention with a portion of the housing cut away to reveal the interior.

Referring now to the drawings, FIGS. 1 and 2 show a preferred embodiment of the present invention in which a housing 12 is compartmentalized to form a storage chamber 14 and a conditioning chamber 28. A wall 33 of chamber 14 includes a narrow slot or opening 31 through which a continuous web 10 is dispensed into conditioning chamber 28. Similarly, a slot 48 in wall 35 of housing 12 forms a second dispensing means through which the web is dispensed to the outside of the housing. Web 10 is stored in chamber 14 in the form of a coiled roll 22, which has a first layer consisting of a thermosetting composite material, for example PMR-15/Graphite composite material. Web 10 further includes a second layer consisting of a backing paper 24 adhered to one side of the first layer. Roll 22 is disposed on a rotatably mounted support roller 21.

The conditions within chamber 14 are maintained in accordance with the requirements of the stored material. Thus, for composite material the temperature is maintained at or near 0° F., for example by means of an external refrigeration unit 17. In the embodiment shown in FIG. 2, this includes a refrigeration coil 15 extending into the chamber. Preferably, the storage chamber has double walls which contain insulation 16 to impede heat transfer through the walls. Thus, by controlling the environment in which roll 22 is stored, any deterioration of the composite material is halted or at least retarded.

Conditioning chamber 28 contains a pair of electrical heating elements 18 and 20 conveniently located proximate slot 31. Through heat regulating means of a type commonly used in the art, not shown, the heating elements are maintained at a temperature selected to heat the composite material above its dew point after the web has been dispensed through slot 31. For example, in a climate with an average temperature of 75° F. and relative humidity of 50%, the composite material would be heated to about 56° F. Chamber 28 further includes a guide roller 36 and paper stripping means 37 positioned past roller 36 for stripping the layer of backing paper 24 off web 10. A support roller 25 is positioned to receive the separated layer of backing paper by way of a further guide roller 38.

As shown in FIGS. 1 and 2, the path along which web 10 advances within housing 12 is defined by a roller assembly comprising the first set of rollers 30 positioned inside chamber 14, a second set of rollers 32 positioned in chamber 28 past heating elements 18 and 20, and a third set of rollers 34 located ahead of slot 48. The rollers, particularly those rollers located at a change in path direction such as at roller assembly 32, must be sized to prevent damage to the web material resulting from strains caused by bending the web material. The strain the web material experiences is inversely proportional to the radius of curvature at a curve in the web path, smaller curves resulting in larger strains. The diameter of the rollers defining the path along which web 10 travels must be sized to prevent damage due to bending.

As previously stated, in operation chamber 14 is maintained at the required conditions, e.g. at a temperature of about 0° F., to prevent deterioration of the composite material. When required by the manufacturing process, web 10 is drawn off roll 22 and advanced through roller assembly 30 and through a first dispensing means formed by slot 31 into conditioning chamber 28. A heating element 17, located proximate roll 22 near the point where web 10 is separated from the roll, heats the web slightly to render it sufficiently flexible for straightening. In chamber 28, web 10 passes between heating elements 18 and 20 which raise the temperature of the composite material to a dew point, thereby improving the workability of the material and preventing the formation of condensation on the material. Web 10 then advances past roller assembly 32 to guide roller 36 where the layer of backing paper 24 is stripped off the web by paper stripping means 37. The stripped backing paper advances past guide roller 38 to support roller 25 where it is collected by coiling it into a roll 26. Thereafter, web 10, which now contains only the layer of composite material, advances past rollers 34 to cut-off mechanism 46 which severs the web portion dispensed through slot 48 for use in the subsequent manufacturing process.

As previously explained, roller assemblies 30, 32 and 34 define the path traveled by web 10 and they facilitate the movement of the web through the housing. For example, rollers 34 may act as drive rollers. To the latter end, a drive motor 40, which may be located in chamber 28 as shown in FIG. 2, is coupled to roller assembly 34 to advance the web through the housing. The motor is also coupled to support roller 25 to facilitate the collection of stripped backing paper. Commonly known brake means for rollers 21 and 25 have been omitted from the drawings for the sake of clarity. After the selected amount of material has been dispensed through slot 48, the operation of drive motor 40 ceases and cut-off mechanism 46 is actuated to sever the dispensed material from the material remaining inside housing 12. Temperature sensors, not shown, Provide inputs to a system controller 42 which monitors and controls the temperature within storage chamber 14 and conditioning chamber 28 by way of refrigeration unit 17 and heaters 18 and 20, respectively, as well as controlling the operation of drive motor 40 and cut-off mechanism 46.

Although web 10 is shown in FIGS. 1 and 2 as initially traveling in a vertical downward direction from chamber 14 to roller assembly 32 then travelling in a horizontal direction until being dispensed through dispensing means 48, chambers 14 and 28 and the elements within housing 12 can be positioned to provide a web path differing from the path shown. For example, a straight path, absent any changes in direction such as that shown to occur at roller assembly 32 in FIGS. 1 and 2, may be desired to prevent damage to the web material resulting from strains created by forcing the material through a curve.

Although web 10 has been described as including a first layer of composite material and a second layer of backing paper, web 10 may consist of a single layer of composite material without backing paper. Paper stripping means 37, support roller 25 and guide rollers 36 and 38 may be deleted from the apparatus described above if web 10 does not include a layer of backing paper or if it is not beneficial to remove the backing paper prior to dispensing the composite material from housing 12. Alternatively, web 10 may include more than two layers. For example, a layer of backing paper may be provided on both surfaces of a layer of composite material.

Figure 3:
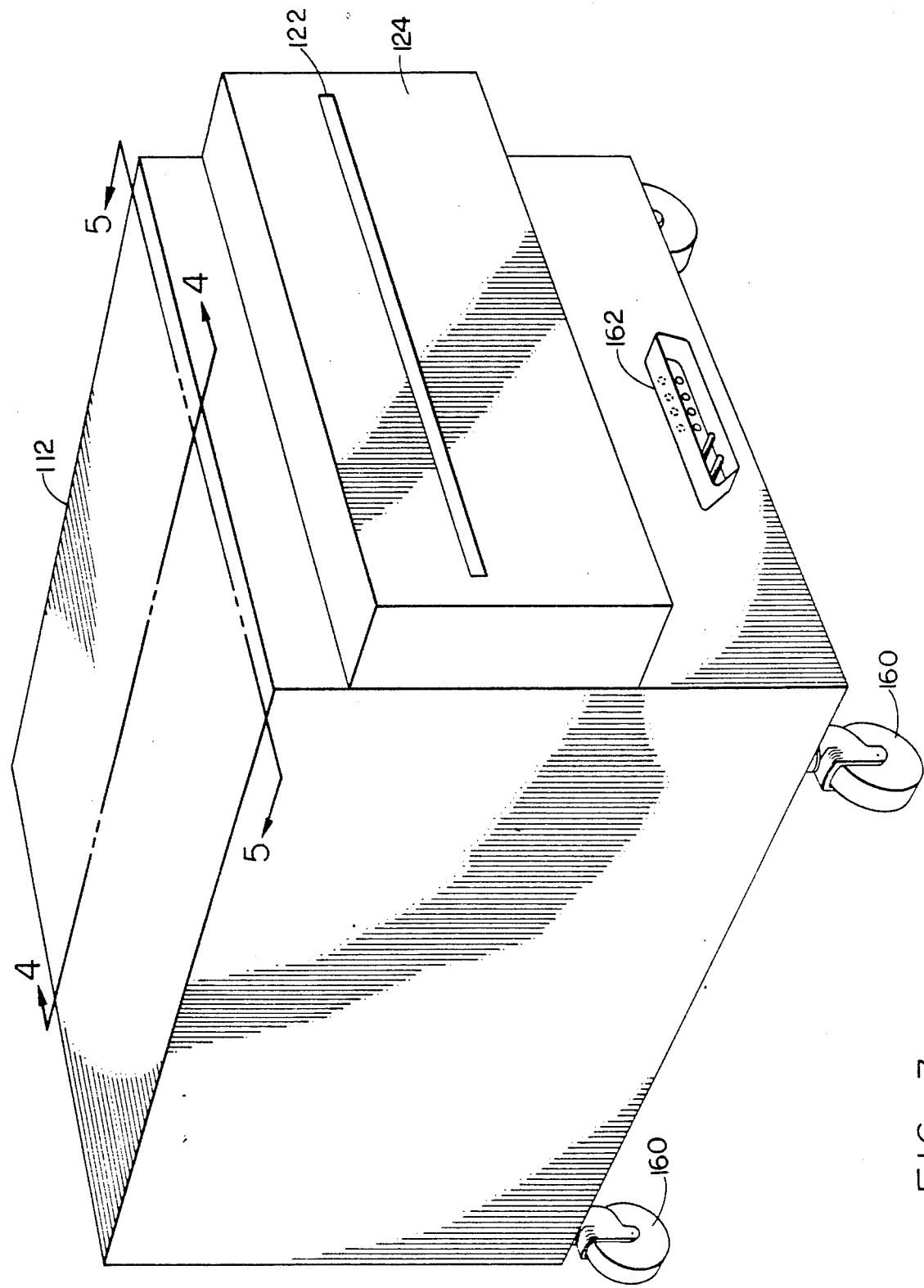
FIG. 3 is a perspective view of another embodiment of the invention for storing and dispensing thermosetting material in sheet form.
Figure 4:
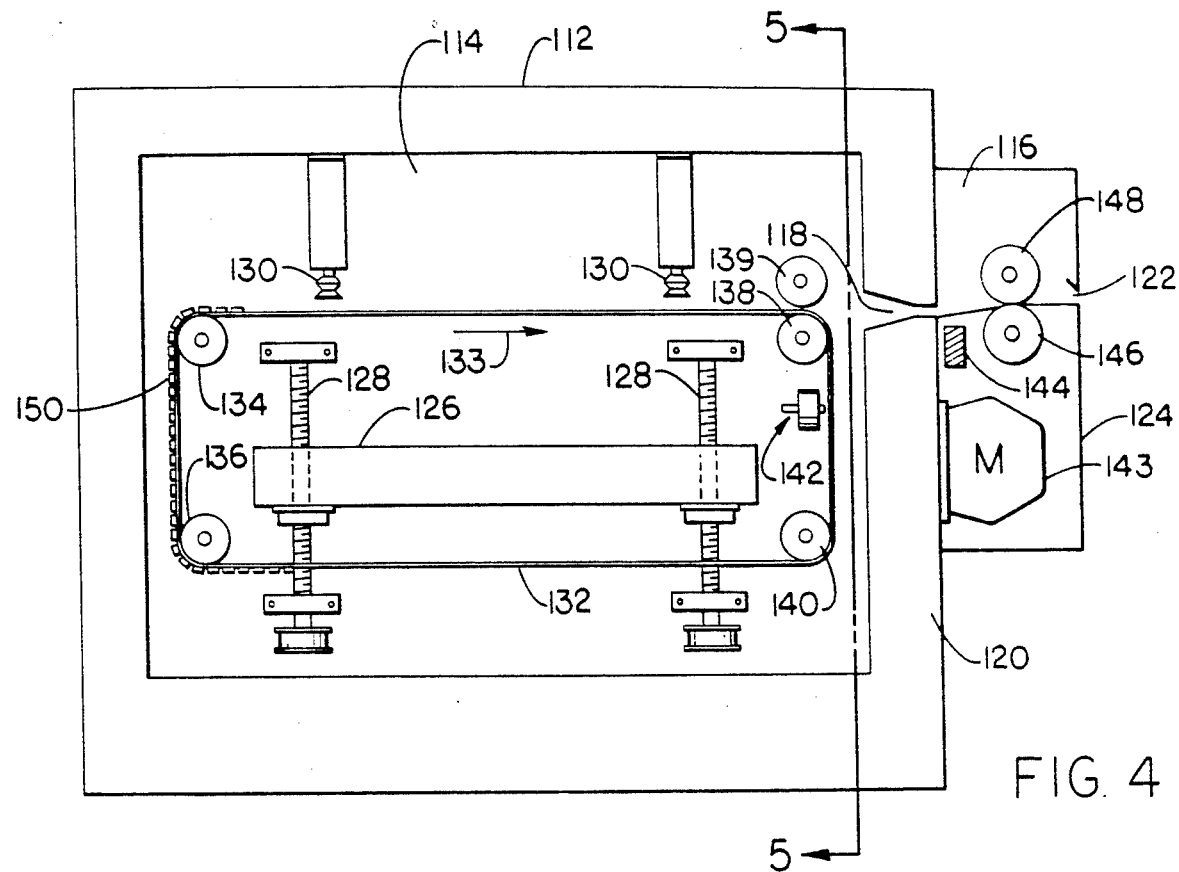
FIG. 4 is a cross-sectional view of the apparatus of FIG. 3 taken along line 4—4.

In the preferred embodiment of the invention as depicted in FIGS. 1 and 2, the composite material, together with its backing paper forms a continuous web and is stored in the form of web roll 22. Alternatively, the composite material may consist of discrete sheets stored in stack form. FIGS. 3, 4 and 5 show an alternative form of the invention for storing and dispensing discrete, rectangular or square, sheets of composite material. A housing 112 is compartmentalized to form a storage chamber 114 and a conditioning chamber 116. A narrow slot or opening 118 in insulated wall 120 of chamber 114 allows successive sheets of composite material to be dispensed to preheat chamber 116. Likewise, a slot 122 in wall 124 of housing 112 forms part of a second dispensing means through which the separate sheets are dispensed to the outside of the housing.

Figure 6:
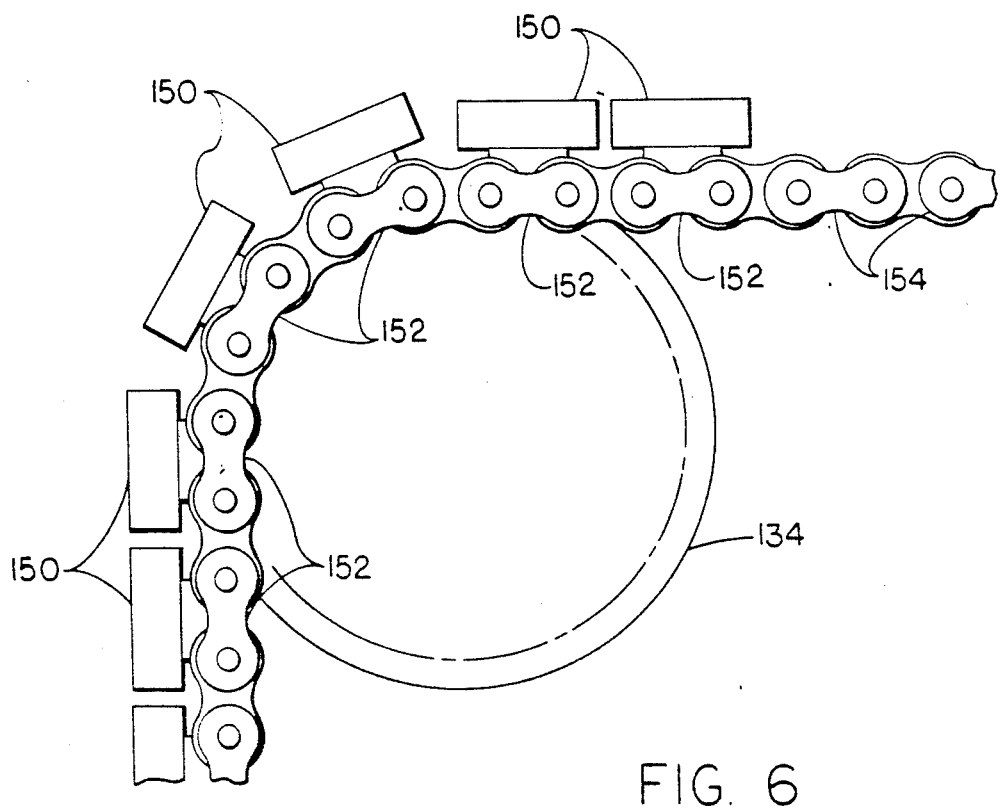
FIG. 6 illustrates the construction of the conveyor belt shown in FIGS. 4 and 5.

Storage chamber 114 contains a table 126 supported by four vertically mounted jack screws 128 which are turned by a motor and belts, not shown, to raise or lower table 126. A plurality of pneumatic suction devices 130 extend downward from the top wall of chamber 114, level with the uppermost position of table 126. Chamber 114 further includes a conveyor belt 132 which encircles table 126 by passing above and below the table. Belt 132 is mounted on rollers 134, 136, 138 and 140 and contains an opening large enough so that when the opening is positioned above table 126 the table can be raised through the opening. The belt consists of two chains 156 and 158 and a plurality of narrow slats 150 connecting corresponding links on the two chains. Slats 150 have been omitted from FIG. 5 for the sake of clarity. FIG. 6 shows the construction of belt 132. A portion of chain 158 in the area of roller 134 is shown.

Chain 158 is formed from a plurality of links 152 and 154 which are connected together to form a loop around rollers 134, 136, 138 and 140. Chain 156 is identically constructed. Slats 150, shown in end view, are connected between links 152 and corresponding links on chain 156. An opening in the conveyor belt is formed by omitting slats between links 154 and the corresponding links on chain 156.

Referring again to FIG. 4, a sensor 142 determines the position of conveyor belt 132 and hence the conveyor belt opening. A drive motor 143 is coupled to roller 140 to drive conveyor belt 132. Drive means for jack screws 128 and brake means for conveyor belt 132 and jack screws 128 have been omitted from the drawings for the sake of clarity. The temperature within chamber 116 is maintained at or near 0° F., for example by the refrigeration means shown and discussed in connection with FIGS. 1 and 2, in order to retard the deterioration of the composite material stored in the chamber.

Conditioning chamber 116 contains an electric heating element 144 conveniently located proximate to slot 118. Heating element 144 is maintained, through heat regulating means not shown, at a temperature as required to heat the composite material to dew point after it has been dispensed through slot 118. Chamber 116 further includes two rollers 146 and 148 for directing the composite material through second dispensing means 122. Roller 146 is also coupled to drive motor 143 which may be located in chamber 116.

In operation, a stack of discrete sheets of composite material is positioned on table 126 in refrigerated storage chamber 114. Prior to dispensing, conveyor belt 132 is positioned so that the opening in belt 132 is positioned directly above table 126 while the table is placed in its lowest position. When material is required by the manufacturing process, jack screws 128 turn to raise table 126 until the uppermost sheet of the stack of composite material rises through the opening in belt 132 and into contact with suction devices 130. A vacuum is applied, enabling the suction devices to grasp and hold the uppermost sheet. Thereafter table 126 and the remainder of the stack are lowered. Drive motor 143 then operates to move conveyor belt 132 in the direction of arrow 133, shown in FIG. 4, by rotating the drive roller, e.g. roller 140. When the opening in belt 132 has moved beyond table 126 and slats 150 are positioned below the sheet held by suction devices 130, the vacuum pressure is removed from the suction devices and the sheet held until then is released onto the conveyor belt. The belt, now moving in direction 133, advances the sheet through first dispensing means 118 into conditioning chamber 116. A guide roller 139 helps direct the sheet through dispensing means 118. In chamber 116 the sheet advances past heating element 144, then passes between rollers 146 and 148 and is dispensed from housing 112 through second dispensing means 122. Roller 146 is also coupled to drive motor 143 to facilitate advancement of the composite material sheet through preheat chamber 116 and dispensing means 122. A system controller, not shown, controls and coordinates the operation of jack screws 128, conveyor belt 132, roller 146, and suction devices 130. The system controller also monitors and controls the temperature within storage chamber 114 and conditioning chamber 116.

Housing 112 is provided with castor wheels 160 and a power and data receptacle 162 which permit easy removal from or placement in a manufacturing process.

When the apparatus has dispensed its supply of composite material into the manufacturing process, it can be readily replaced with a fully stocked dispenser with minimal loss of manufacturing time. The original dispenser can be removed to an off line area, restocked, and stored until required.

The preceding discussion describes an apparatus and method for storing and subsequently dispensing thermosetting material into a manufacturing process. The material, which may be in the form of a continuous web, or discrete sheets, is stored at a reduced temperature within the apparatus to inhibit chemical deterioration of the material. Upon demand, the material is fed into a conditioning chamber and there heated to improve its workability and to prevent the formation of condensation as the material is ultimately dispensed into the manufacturing process. The length of web supplied to the manufacturing process, or the number of sheets successively delivered, will depend on the demands of the manufacturing process only. Thus, only such material as is required will be removed from refrigerated storage and no unnecessary storage and transport of the material is required.

It will be clear to those skilled in the art that various modifications and changes of the apparatus and method described above are possible without departing from the scope of the present invention. For example, the humidity and pressure within the storage chamber may additionally be controlled to prevent or retard detrimental effects on the material being stored. Although a single conditioning chamber is shown and described, conditioning may also occur in stages, e.g. in a series of conditioning chambers through which the material is moved in succession.

PMR-15/Graphite composite material has been discussed above as one material for which this invention has applicability. However, the apparatus and method described is adaptable to any composite material including graphite impregnated with epoxy or some other resin. Also, the apparatus and method may be adapted to store and dispense environmentally sensitive materials other than composite materials which are subject to deterioration due to the effects of temperature, humidity or pressure while in storage, but which benefit from, or require, conditioning prior to use. Accordingly, it is intended that the invention to be secured by Letters of Patent be limited only by the scope of the appended claims.

What is claimed is:

1. Apparatus for storing and dispensing an environmentally sensitive material, said apparatus comprising:
   a housing;
   a storage chamber in said housing;
   means for controlling the environmental conditions within said storage chamber;
   at least one conditioning chamber in said housing;
   conditioning means in said conditioning chamber;
   means for advancing said material along a predetermined path from said storage chamber through said conditioning chamber;
   said means for controlling the environmental conditions in said storage chamber including means for maintaining said storage chamber at a temperature to retard chemical cross-linking of said composite material; said conditioning means including means in said conditioning chamber for heating said composite material.

first dispensing means positioned in said path for dispensing said material from said storage chamber into said conditioning chamber; and second dispensing means positioned in said path for dispensing said material from said conditioning chamber to the outside of said housing.

2. Apparatus according to claim 1 in which said material takes the form of a continuous web and further comprising a support roller rotatably mounted in said storage chamber for supporting said web in coiled roll form.

3. Apparatus according to claim 2 and further comprising means for selectively severing the material dispensed to the outside of said housing from the material remaining within.

4. Apparatus according to claim 2, in which said material constitutes a first layer of said continuous web, said web including a second layer comprising a backing paper adhered to one side of said first layer.

5. Apparatus according to claim 4 and further comprising:
means positioned in said path following said first dispensing means for stripping said second layer off said web; and
means for collecting said stripped-off second layer.

6. Apparatus according to claim 1 in which said material takes the form of discrete sheets stored in stacked form in said storage chamber; and
said advancing means including means for successively feeding said sheets into said predetermined path.

7. Apparatus according to claim 1 in which said material comprises PMR-15/Graphite composite material.

8. Apparatus for providing thermosetting composite material to a manufacturing process, said composite material being in the form of a continuous web, said material constitutes a first layer of said continuous web, said web including a second layer comprising a backing paper adhered to one side of said first layer, said apparatus comprising:
a housing including a storage chamber and a conditioning chamber;
a support roller rotatably mounted in said storage chamber for supporting said web in coiled roll form;
means for maintaining said storage chamber at a temperature selected to retard chemical cross-linking of said chemical material;
means for advancing said web along a predetermined path in said housing;
first dispensing means positioned in said path for dispensing said web from said storage chamber into said conditioning chamber;
heating means in said conditioning chamber for heating the web received from said storage chamber to improve the workability of said composite material;
second dispensing means for dispensing said material to the outside of said housing;
means for selectively severing the portion of said material dispensed to the outside of said housing from the portion remaining within, means positioned in said path following said heating means for stripping said second layer off said web; and means for collecting said stripped-off second layer.

9. Apparatus for providing thermosetting composite material to a manufacturing process, said material being in the form of discrete sheets, said apparatus comprising:
a housing;
a storage chamber in said housing for storing said discrete sheets in stacked form;
means for maintaining said storage chamber at a temperature selected to retard chemical cross-linking of said composite material;
a conditioning chamber in said housing;
means for successively feeding said sheets into a predetermined path in said housing and advancing said sheets along said path;
first dispensing means positioned in said path for dispensing said sheets from said storage chamber into said conditioning chamber;
heating means in said conditioning chamber for heating the sheets received from said storage chamber to improve the workability of said composite material; and
second dispensing means positioned in said path for dispensing said sheets from said conditioning chamber to the outside of said housing.

10. A method for storing and dispensing environmentally sensitive material, said material consists substantially of a thermosetting composite material, comprising the steps of:
controlling the environmental condition of said material in a storage chamber enclosed within a housing;
advancing said material along a predetermined path in said housing;
dispensing said material from said storage chamber into a conditioning chamber enclosed within said housing;
conditioning said material in said conditioning chamber to improve its workability;
dispensing said material from said conditioning chamber into a manufacturing said step of controlling the environmental condition of said material including maintaining said storage chamber at a preselected temperature; and said conditioning step including heating said material in said conditioning chamber.

11. The method of claim 10 wherein said material comprises PMR-15/Graphite composite material.

* * * * *